US00RE34211E

United States Patent [19]

Kuroiwa et al.

[11] E Patent Number: Re. 34,211

[45] Reissued Date of Patent: Apr. 6, 1993

[54] AIR-FUEL RATIO DETECTING SENSOR

[75] Inventors: Hiroshi Kuroiwa, Hitachi; Yoshishige Oyama, Katsuta, both of Japan

[73] Assignee: Hitachi, Ltd., Tokyo, Japan

[21] Appl. No.: 603,008

[22] Filed: Oct. 25, 1990

Related U.S. Patent Documents

Reissue of:

[64] Patent No.: 4,779,455
Issued: Oct. 25, 1988
Appl. No.: 81,847
Filed: Aug. 5, 1987

[30] Foreign Application Priority Data

Aug. 13, 1986 [JP] Japan ..... 61-188506

[51] Int. Cl.[5] ..... G01M 15/00

[52] U.S. Cl. ..... 73/116

[58] Field of Search ..... 73/116, 35; 123/494

[56] References Cited

U.S. PATENT DOCUMENTS 3,067,610 12/1962 Bockemuehl et al. ..... 73/35 X
4,358,952 11/1982 Maurer et al. ..... 73/35
4,381,748 5/1983 Eckert et al. ..... 73/116 X

*Primary Examiner*—Jerry W. Myracle
*Attorney, Agent, or Firm*—Fay, Sharpe, Beall, Fagan, Minnich & McKee

[57] ABSTRACT

An air-fuel ratio detecting combustion sensor. Combustion light signals of two given waveform bands are photoelectrically converted into corresponding electrical waveform signals. On the basis of phase difference in time points at which the two signals are generated, respectively, the air-fuel ratio is arithmetically determined.

23 Claims, 12 Drawing Sheets

AIR-FUEL RATIO DETECTING SENSOR

Matter enclosed in heavy brackets [ ] appears in the original patent but forms no part of this reissue specification; matter printed in italics indicates the additions made by reissue.

BACKGROUND OF THE INVENTION

The present invention relates generally to an apparatus for detecting combustion flame light in an internal combustion engine and more particularly to a sensor for detecting the air-fuel ratio of combustion gas mixture on the basis of spectral characteristics of the combustion light.

Various approaches have heretofore been made to extract externally the combustion flame light signal produced within the engine for utilizing as information concerning the combustion. By way of example, optical ignition timing detection system is actually adopted in diesel engines and others.

On the other hand, there is disclosed in JP-A-No. 58-82039 a system for determining the air-fuel ratio by detecting light intensities emitted by combustion within the engine and by making use of the intensity ratios. However, in this prior known system, no appropriate measures are adopted for coping with the changes in transmittivity of a combustion light detecting element face due to dirt or contamination. Consequently, difficulty is encountered in detecting the air-fuel ratio with a satisfactorily high accuracy.

More specifically, the hitherto known air-fuel ratio detecting system is operative on the basis of the ratio of intensities of combustion flame light having particular wavelengths suffers from various shortcomings such as change in the transmittivity of the distinct light wavelengths due to deposition on the detecting end face, variation in the intensity ratio brought about by heat radiation under high environmental temperature condition, whereby the detection of air-fuel ratio with satisfactorily high accuracy is rendered essentially impractical.

SUMMARY OF THE INVENTION

An object of the present invention is to provide an air-fuel ratio sensor system for an internal combustion engine which system is capable of detecting the air-fuel ratio with significantly improved accuracy by determining the air-fuel ratio on the basis of distinct electrical wavelength signals derived through photoelectric conversion from the combustion flame light produced within the combustion chamber is every combustion cycle or by averaging over several cycle for each of engine cylinders.

According to an aspect of the present invention, light signals of two distinct wavelength regions derived from the combustion flame light produced in the combustion chamber are utilized for detecting in terms of the engine crank angle the phase difference in the time points at which the two distinct wavelength signals are produced, respectively, wherein the corresponding air-fuel ratio is determined by reading out relevant information from a memory which stores therein previously established relations or correspondences between the phase differences and the air-fuel ratios or alternatively through arithmetical determination based on the relation read out from the memory. In other words, according to the invention, the fact is made use of that the intensities of particular light wavelengths produced by combustion within the engine can vary in the level due to various factors mentioned hereinbefore but undergo no adverse infuence in respect to the time points at which the light wavelengths in concern are generated.

DESCRIPTION OF THE PREFERRED EMBODIMENTS

In the following, the present invention will be described in detail in conjunction with exemplary embodiments thereof with reference to the accompanying drawings.

Figure 1:
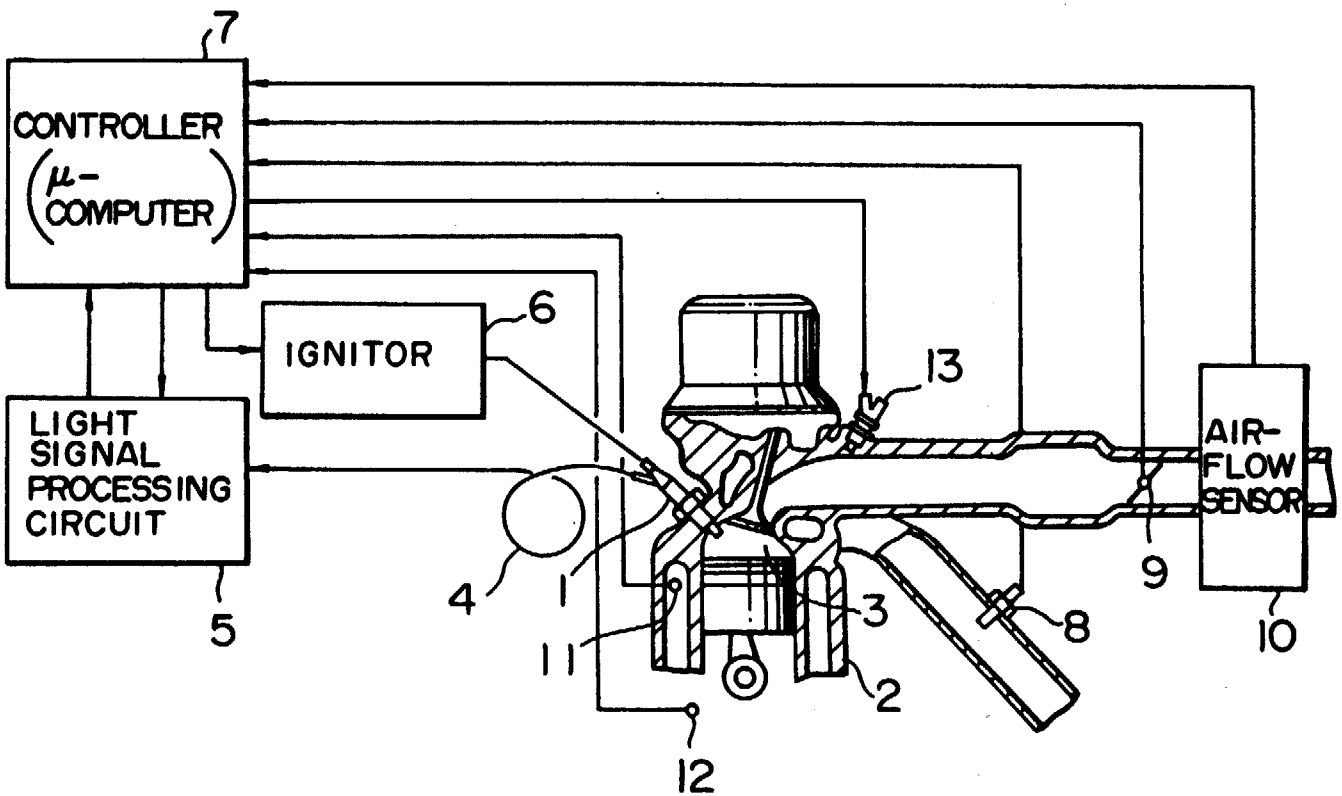
FIG. 1 is a view showing schematically a main portion of an internal combustion engine to which the air-fuel ratio sensor system according to the invention can be applied.

FIG. 1 shows a general arrangement of an air-fuel ratio sensor system for an internal combustion engine according to an embodiment of the present invention which system is composed of a combustion flame light detecting endpiece 1 mounted in a combustion chamber 3 of an engine 2 so as to be exposed to the interior of the combustion chamber 3, an optical fiber cable 4 having one end connected to the combustion light detecting endpiece 1 for transmitting combustion light signal derived therefrom and a light signal processing circuit 5 coupled operatively to the optical fiber cable 4 at the other end thereof.

Figure 2:
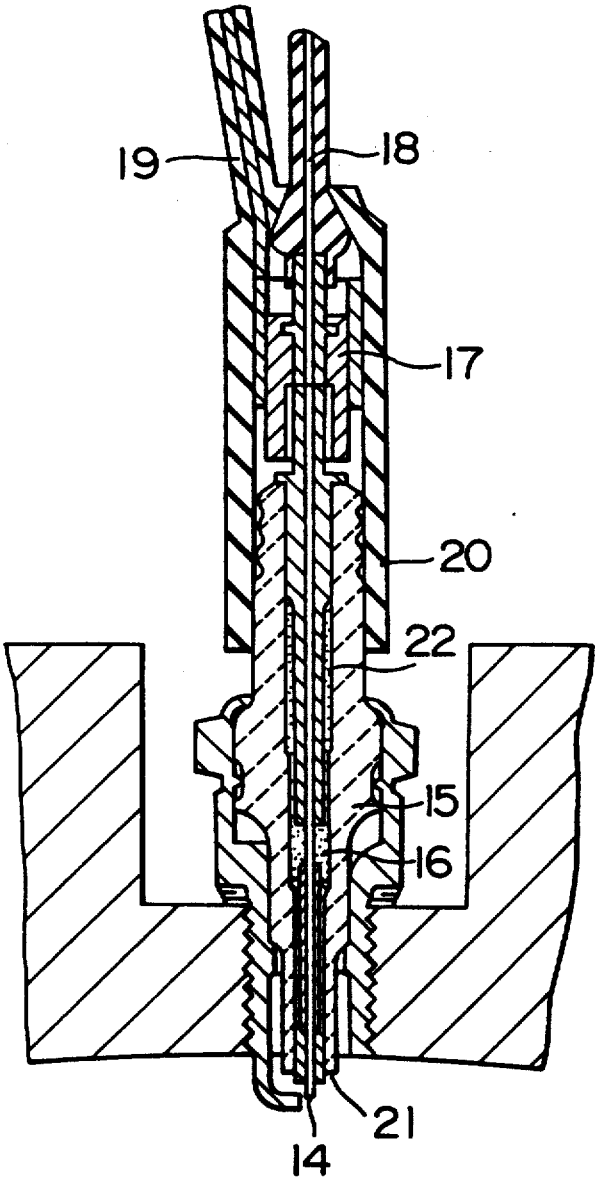
FIG. 2 is a view showing a structure of an end piece of the air-fuel ratio sensor system according to an embodiment of the present invention.

The combustion light detecting endpiece 1 can be preferably realized integrally with an ignition plug as shown in FIG. 2 so as to serve also for the function of the ignition plug. To this end, the combustion light detecting endpiece 1 is supplied with an ignition pulse signal from a controller 7 constituted by a microprocessor through an ignition control system 6.

The combustion light signal applied to the light signal processing circuit 5 undergoes photoelectric conversion, the resulting electric waveform signal being applied to the controller 7 which is additionally supplied with various information signals such as the air-fuel ratio signal produced by an $O_2$-sensor (inherent air-fuel ratio sensor) 8, a throttle-valve opening-degree signal produced by a sensor or switch 9 for detecting the opening degree of a throttle valve, an air-flow signal detected by an air-flow sensor 10, an engine coolant temperature signal produced by a water temperature sensor 11, an engine rotation number signal detected by a rotation sensor 12 (such as crank angle sensor, top-dead center sensor or the like), a crank angle signal and others. These input signals are arithmetically processed by the controller 7 to determine the optimum amount of fuel supply, the optimum ignition timing and other parameters, whereby corresponding control signals are produced as the output sinnals of the controller 7. The fuel is thus injected into the engine in the optimum amount through a fuel injection 13 in response to the corresponding control signals supplied from the controller 7. In this connection, it should be mentioned that although the system shown in FIG. 1 is assumed to be applied to a multi-point fuel injection system, the invention can be equally applied to other fuel injection system such as carburetor system, single-point fuel injection system and others. Further, although a direct air-flow measuring system including the air-flow sensor is assumed to be adopted in the system shown in FIG. 1, it is however apparent that there can be employed any suitable system such as a speed density system for arithmetically determining the intake air flow on the basis of the number of engine rotation and the negative (vacuum) suction pressure, a system for arithmetically determining the intake air-flow on the basis of the number of engine rotation and the opening degree of the throttle valve and the like.

FIG. 2 shows in a sectional view a main portion of the integral structure of the combustion light detecting endpiece realized integrally with the ignition plug. Referring to the figure, the integral structure includes a center electrode 21 of the ignition plug, and a quartz glass fiber 14 having a diameter on the order of 1.0 to 1.5 mm and extending through the structure along the center axis of a high voltage terminal member 22 for serving as a light conductor. The center electrode 21, the high-voltage terminal member 22 and the optical glass fiber 14 are fixedly secured to an electrically insulating isolator sleeve 15 at a sealed portion 16 of an electrically conductive glass seal material through thermal fusion. The combustion flame light caught by the quartz glass fiber 14 is introduced to an optical fiber cable 18 having a high flexibility through a coupler or connector 17 to be ultimately fed to the light signal processing circuit 5. The connector 17 serves also as the means for receiving a high voltage for the ignition plug. More specifically, the high voltage supplied through a high voltage conductor 19 is applied to the center electrode 21 by way of the aforementioned connector. A reference numeral 20 denotes a protection cover for insulating or protecting the surface of the insulator 15 against creeping discharge otherwise possibly produced under a high voltage.

Figure 3A:
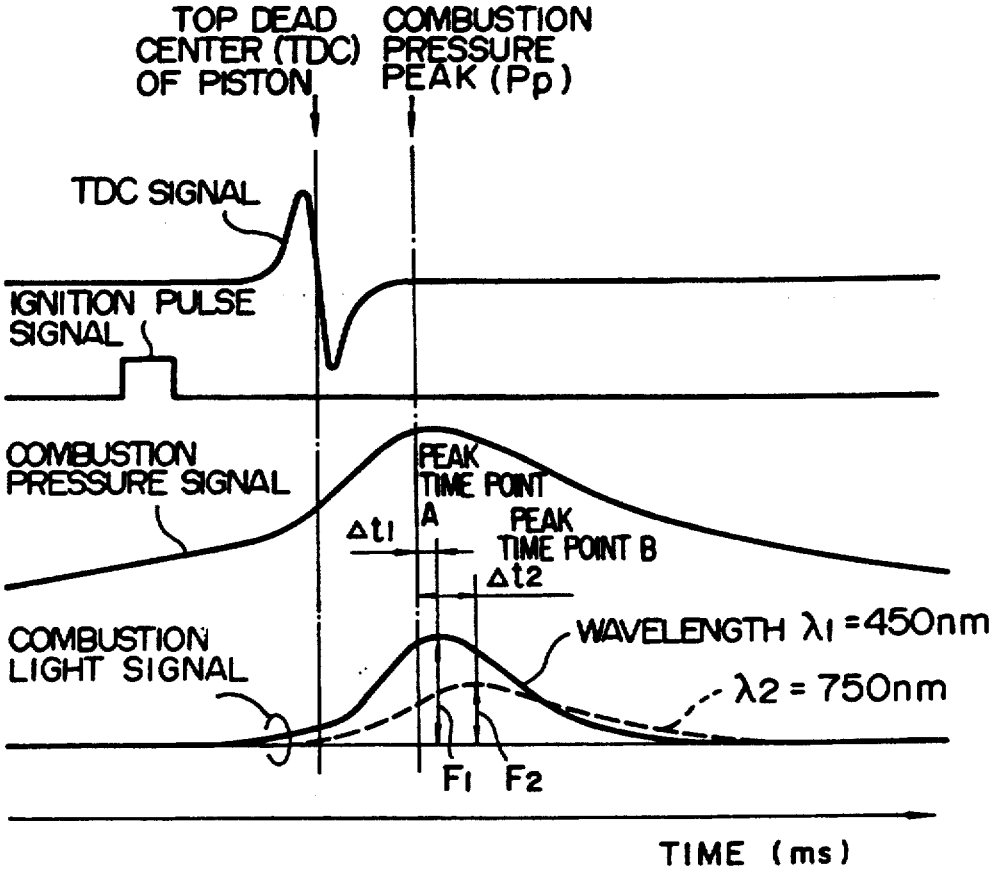
FIGS. 3A and 3B are views for illustrating graphically the results of spectra analysis of light produced by the combustion of air-fuel mixture.
Figure 3B:
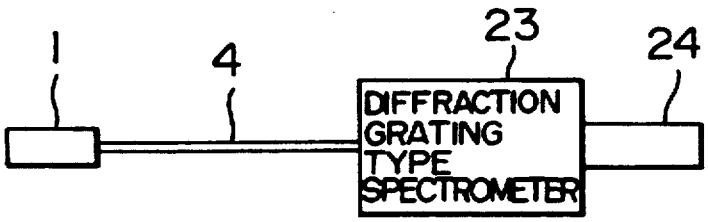

FIG. 3A shows waveforms of signals generated by a photomultiplexer 24 as the result of the photoelectric conversion of light intensities for given wavelength components of the combustion light introduced to a diffraction grating type spectrometer 23 from the combustion light detecting endpiece 1 through the optical fiber cable 4. Since the combustion can take place only intermittently in the engine and the state of combustion may vary more or less from cycle to cycle, the signal waveforms shown in FIG. 3A are plotted on the basis of data obtained through sampling and by averaging over every 16-cycle interval. The waveform components illustrated in FIG. 3 are extracted at the wavelengths $\lambda_1$ of 450 nm located in the visible light range nearer to the ultraviolet region and at the wavelengths $\lambda_2$ of 750 located in the vicinity of the infrared region.

Figure 4:
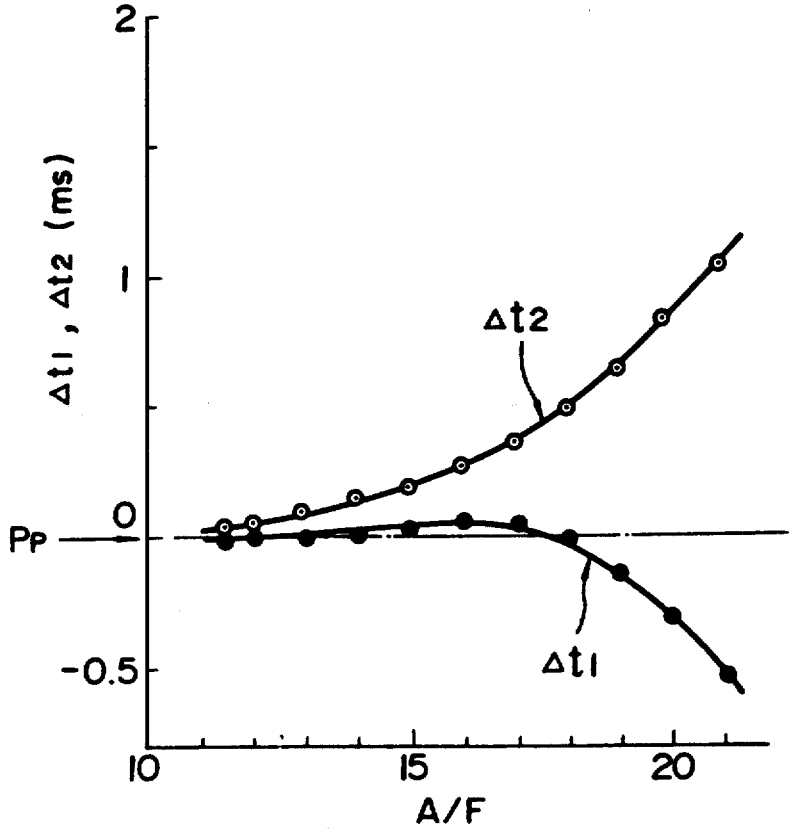
FIG. 4 is a view for illustrating graphically relationships of peak time points of specific wavelength signals to the air-fuel ratio (A/F)
Figure 5:
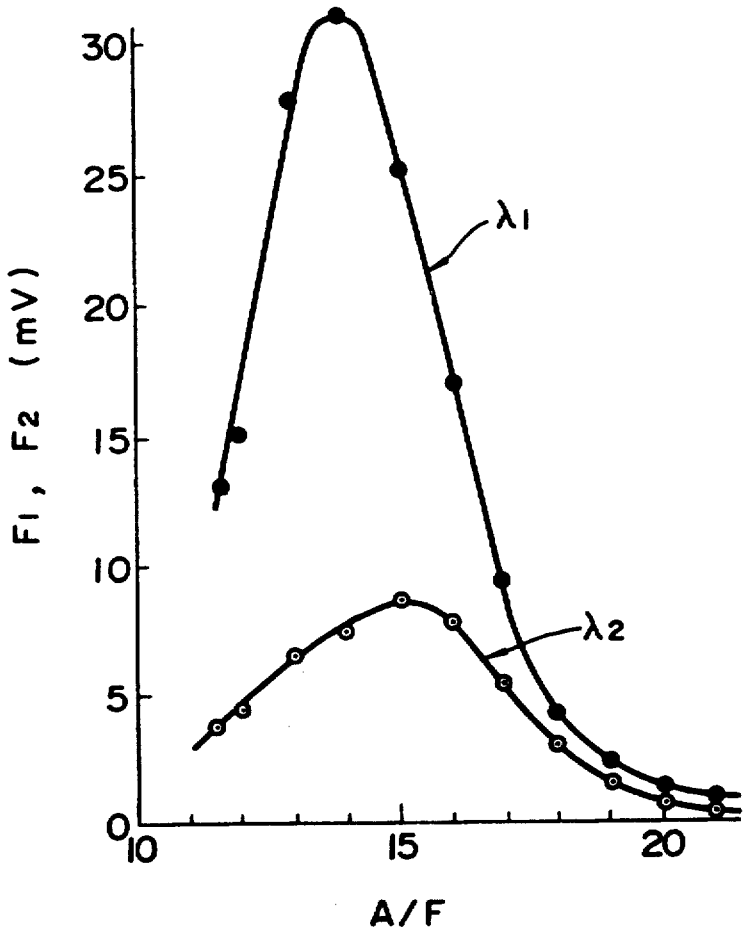
FIG. 5 is a view for illustrating graphically characteristics of the wavelength signals.

Referring to FIG. 3A in further detail, the ignition pulse signal is applied to the ignition plug before the piston attains the top dead center TDC to cause spark discharge to take place, whereupon a flame nucleus is formed, which grows within a relatively short time to such extent that combustion of the whole air-fuel mixture within the combustion chamber begings. At this time point, the combustion pressure within the combustion chamber increases abruptly, whereby the piston is furnished with energy in an amount enough to perform reciprocation. Further, at the beginning of combustion, the combustion light intensity rises up to a peak at a substantially same time point as the peak of the combustion, being followed by a progressively falling trail. In this connection, it has been experimentally established that the time points A and B at which the combustion light signal waveforms (corresponding to those indicated by $\lambda_1$ and $\lambda_2$, respectively) attain respective peaks vary relative to the time point $P_p$ where the peak of the combustion pressure signal makes appearance as a function of the air-fuel ratio of the gas mixture supplied to the combustion chamber. More specifically, when the time difference between the peak time points A and $P_p$ of the light signal having the wavelength $\lambda_1$ (=450 nm) and the combustion pressure, respectively, is represented by $\Delta t_1$ with the time difference between the peak time point B of the signal waveform $\lambda_2$(=750 nm) and the peak time $P_p$ being represented by $\Delta t_2$, it has been found from the experimental measurements that there exist such correlations as illustrated in FIG. 4 between the air-fuel ratio (A/F) and the time differences $\Delta_1$ and $\Delta_2$, respectively. As will be seen in FIG. 4, the phase or time difference $\Delta_1$ goes negative as the air-fuel ratio A/F is increased, i.e. the peak of the light signal $\lambda_1$ makes appearance at an earlier time point than the peak of the combustion pressure occurring at the time point $P_p$. On the other hand, the time (phase) difference $\Delta_2$ becomes greater as the air-fuel ratio (A/F) is increased, i.e. the light signal $\lambda_2$ attains the peak with a delay relatiVe to the peak time $P_p$ of the combustion pressure. In other words, it is believed that when the air-fuel ratio (A/F) is high, the light signal of waveform $\lambda_1$ (=450 nm) representative of the flame rich in blue is first produced, which is then followed by generation of light signal of wavelength $\lambda_2$ (=750 nm), i.e. generation of flame rich in red. However, no correlation is found between the tendency mentioned above and the peak values $F_1$ and $F_2$ (FIG. 3A) of the light signals $\lambda_1$ and $\lambda_2$, as will be seen from FIG. 5 in which the peak values $F_1$, $F_2$ are plotted as a function of the air-fuel ration (A/F).

More specifically, the peaks $F_1$ and $F_2$ assume respective maximum values in the vicinity of the theoretical air-fuel ratio and are decreased as the fuel air-ratio is increased or decreased from the theoritical air-fuel ratio.

As will now be appreciated, the peak time point of the light signal of given particular wavelength varies in dependence on the air-fuel ratio. However, the peak time of the combustion pressure as a reference time point is of less utility for practical applications. In this conjunction, there exist however the following relations:

$$\Delta t = \Delta t_1 - \Delta t_2, \text{ and } \Delta\theta = f(\Delta t, N)$$

Figure 6:
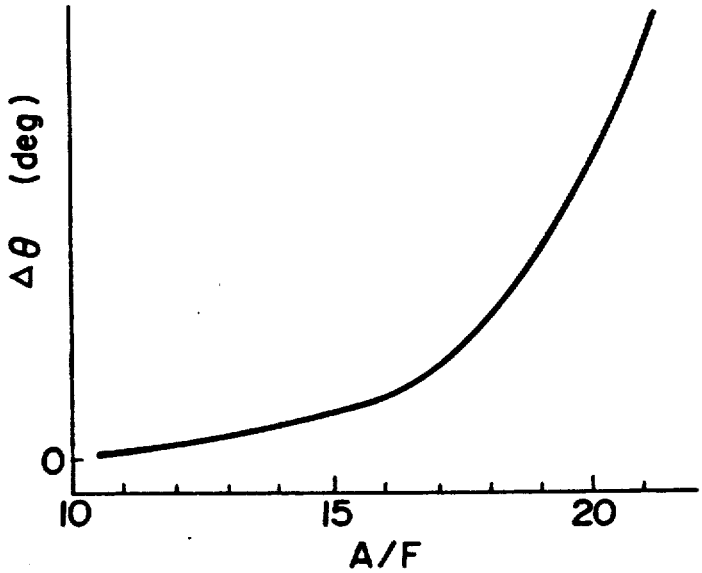
FIG. 6 is a view for illustrating relationships between the air-fuel ratio and the phase difference angle ($\Delta\theta$) intervening between the time points at which two distinct light wavelength signals are produced, respectively.

FIG. 6 illustrates graphically a relation between the air-fuel ratio (A/F) and $\Delta\theta$ which represents the phase difference (degree) of the engine crank angle derived from the time differences $\Delta t_1$ and $\Delta t_2$ on the basis of the relation mentioned above. Although the relation is nonlinear, definite characteristic of the quantity $\Delta\theta$ for the air-fuel ratio (A/F) can thus be determined. Accordingly, in the combustion sensor system under consideration, the air-fuel ratio can thus be arithmetically determined on the basis of the quantity $\Delta\theta$ by means of the controller constituted by a microprocessor, which quantity $\Delta\theta$ can also be arithmetically derived. Parenthetically, experiments were conducted for a number of light signals having wavelength differing from $\lambda_1$ (=450 nm) and $\lambda_2$ (=750 nm) in addition to the latter and coincidence has been found in the overall tendency described above among the various light wavelengths although difference is found in terms of the absolute value. Accordingly, the two distinct light wavelengths are basically not limited to any specific wavelength values.

Figure 7A:
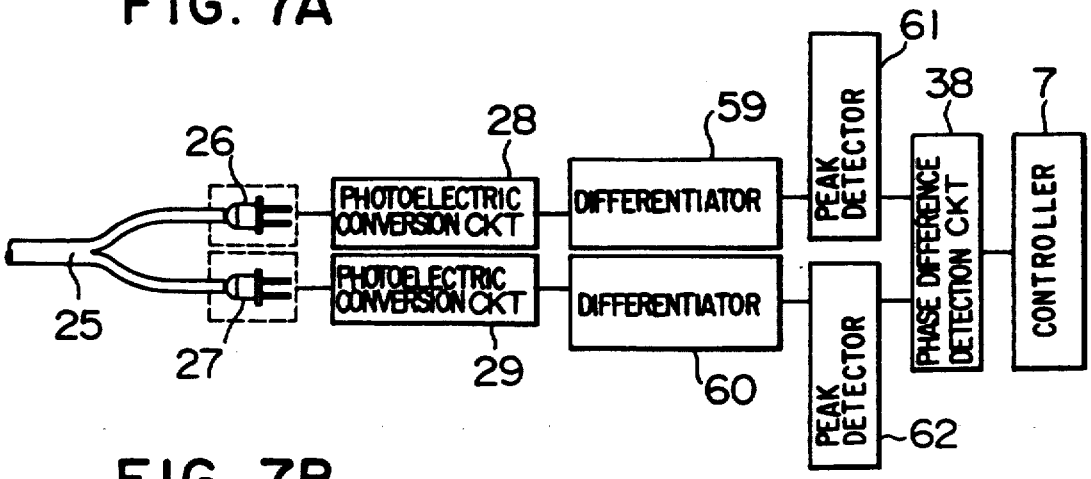
FIGS. 7A, 7B and 7C are views showing, respectively, systems for splitting and processing two distinct light wavelength signals for determining the air-fuel ratio according to exemplary embodiments of the invention.
Figure 7B:
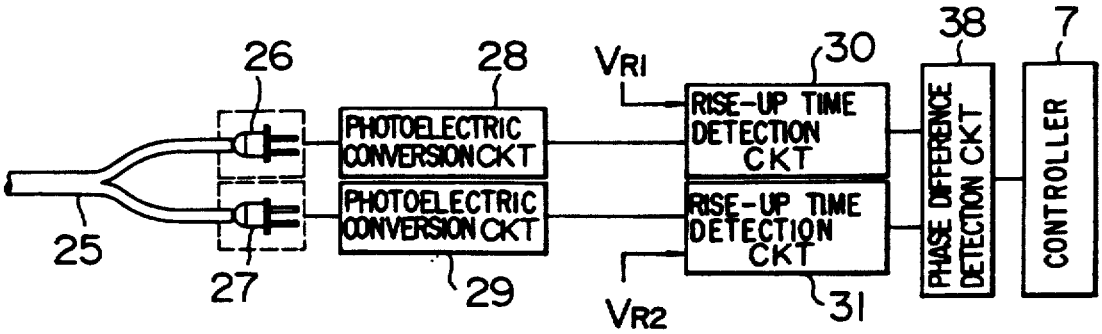
Figure 7C:
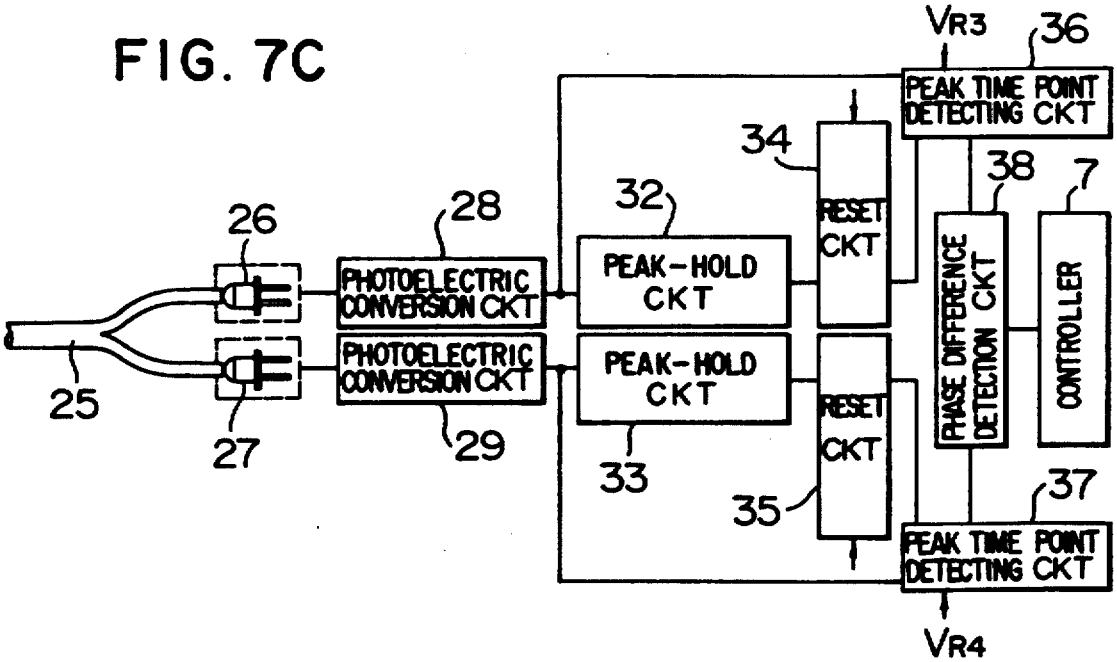

FIGS. 7A, 7B and 7C are block diagrams showing, respectively, system arrangements for splitting the combustion flame light into two specific wavelengths and processing the light signals with the aim for accomplishing the intended object of the invention starting from the experimentally established fact elucidated above.

Referring to FIG. 7A, the combustion light signal transmitted through the optical fiber cable 25 is split into two wavelength components $\lambda_1$ and $\lambda_2$ and applied to photoelectric conversion elements 26 and 27 which may be constituted by phototransistors, photodiodes or the like and which exhibit maximum sensitivities in the wavelength bands corresponding to the aforementioned wavelengths $\lambda_1$ and $\lambda_2$, respectively. After having been processed by photoelectric conversion circuits 28 and 29, respectively, the electric signals resulting from the above mentioned photoelectric conversion are differenciated by associated differentiating circuits 59 and 60, being followed by detections of the respective peaks by associated peak detection circuits 61 and 62, respectively, whose output signals are supplied to a phase-difference pulse signal generating circuit 38 to produce a pulse-coded phase difference signal which is then supplied to the controller 7 constituted by a microcomputer.

The system shown in FIG. 7B differs from the one shown in FIG. 7 in that the outputs of the circuits 28 and 29 are applied to rise-up time point detecting circuits 30 and 31, respectively, in view of the fact that both the output signals produced by the circuits 28 and 29 bear a substantially similar tendency to each other in respect to the relation between the signal peak and the rise-up time point. The pulse-coded signals produced by the circuits 30 and 31 and representing the rise-up time points of the respective input signals are then applied to the phase difference pulse generating circuit 38 where the phase difference between both signals is detected and pulse-coded. The output signal of the circuit 38 is supplied to the controller 7.

The system arrangement shown in FIG. 7C differs from the one shown in FIG. 7A in that peak hold circuits 32 and 33 followed by reset circuits 34 and 35. respectively, are connected to the photoelectric conversion circuits 28 and 29, respectively, whereby the shaped peak-hold waveforms are derived from the signals outputted by the circuits 28 and 29, respectively, and supplied to the associated peak time detection circuits 36 and 37 for detecting the peak time points of the respective input signals. The output signals of the circuits 30 and 31 are applied to the phase difference pulse signal generating circuit 38 which produces a pulse-coded signal representative of the phase difference between the input signals thereto, the pulse-coded signal being then supplied to the controller 7.

Figure 8:
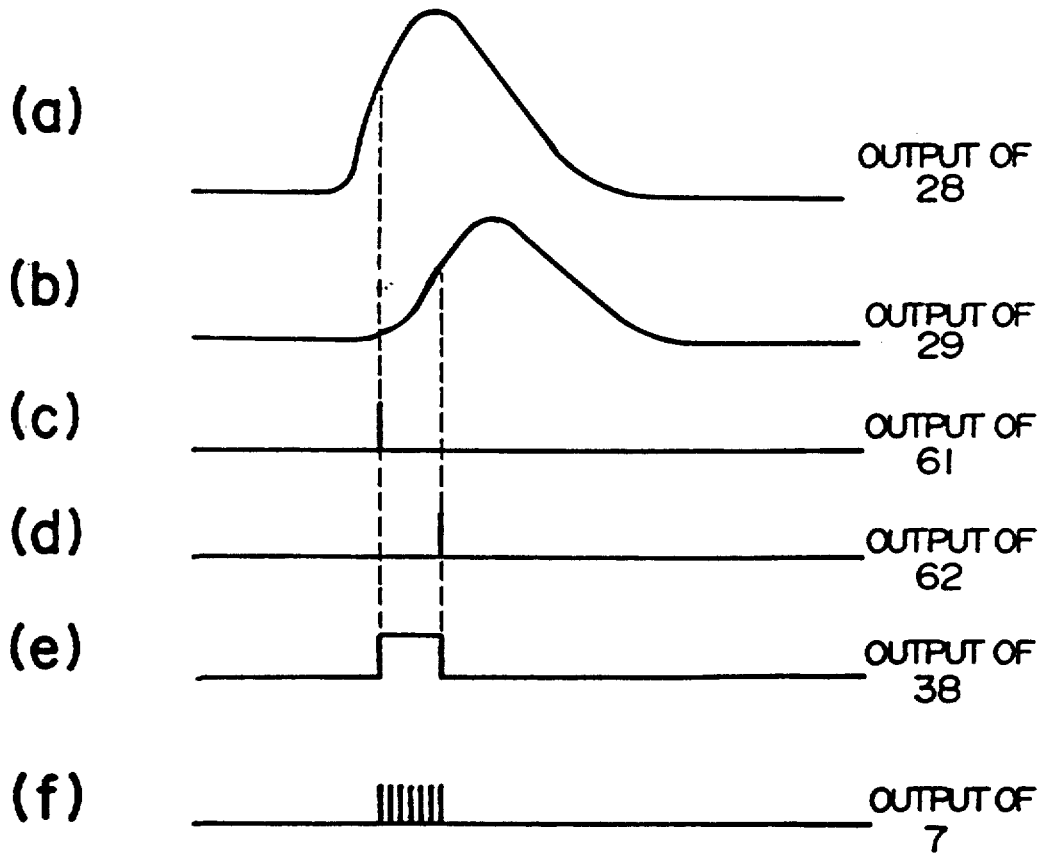
FIGS. 8, 9 and 10 are signal waveform diagrams for illustrating signal processing procedures taking place in the systems shown in FIGS. 7A, 7B and 7C, respectively.

FIG. 8 is a signal waveform diagram for illustrating the signal processing procedure performed by the system shown in FIG. 7A. The signal (a) outputted by the photoelectric conversion circuit 28 and representative of light having the wavelength $\lambda_1$ is differentiated by the differentiating circuit 59, being followed by generation of peak signal (c) by the peak detection circuit 61. On the other hand, the signal (b) produced by the photoelectric conversion circuit 29 and representative of light having the wavelength $\lambda_2$ is differentiated by the differentiating circuit 60, whereby a peak signal (d) is produced by the peak detection 62. Both signals (c) and (d) are applied to the phase difference pulse generating circuit 38 which responds thereto for producing a pulse signal (e) which assumes a high level during a period intervening between the peak signals (c) and (d). The pulse signal (e) is supplied to the controller 7 to enable the crank angle pulses to be counted during the above-mentioned period, whereby the crank angle is arithmetically determined, as is illustrated at (f) in FIG. 8.

Figure 9:
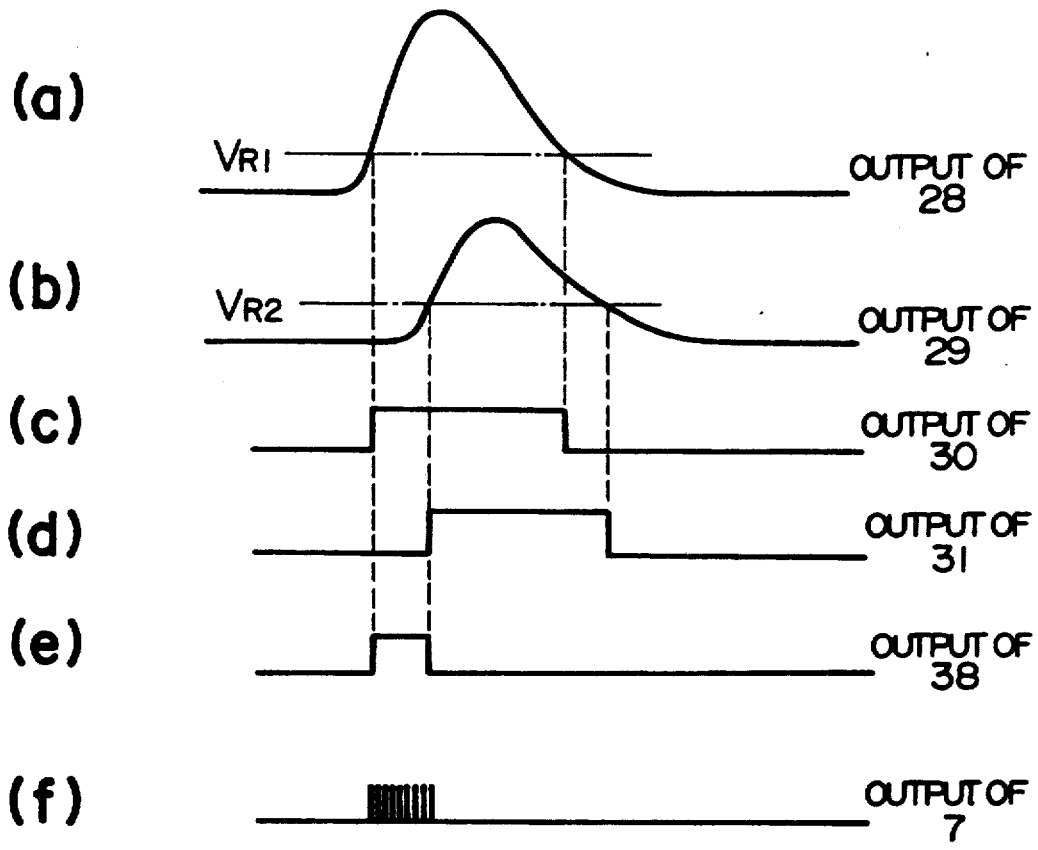

FIG. 9 is a view for illustrating the signal processing procedure in the system shown in FIG. 7B. The signal (a) obtained through the photoelectric conversion circuit 28 and representing light of the wavelength $\lambda_1$ is supplied to the rise-up time point detection circuit 30 to be compared with a preset voltage $V_{R1}$. On the other hand, the signal representative of light having the wavelength $\lambda_2$ obtained through the photoelectric conversion circuit 29 is applied to rise-up time point detecting circuit 31 to be compared with a preset voltage $V_{R2}$. When the voltage values of the signals (a) and (b) become greater than the preset signals $V_{R1}$ and $V_{R2}$, respectively, shaped pulse signals (c) and (d) are produced and supplied to the phase difference pulse generating circuit 38 which then produces a pulse signal (e) which assumes a high level during a period which corresponds to the difference in time between the rise-up edges of to pulse signals (c) and (d). The phase difference pulse signal (e) is supplied to the controller 7 to enable the crank angle pulses to be counted during the period in which the pulse signal (e) is high, whereby the phase difference between the pulse signals (c) and (d) is arithmetically determined in terms of the difference in the crank angle.

Figure 10:
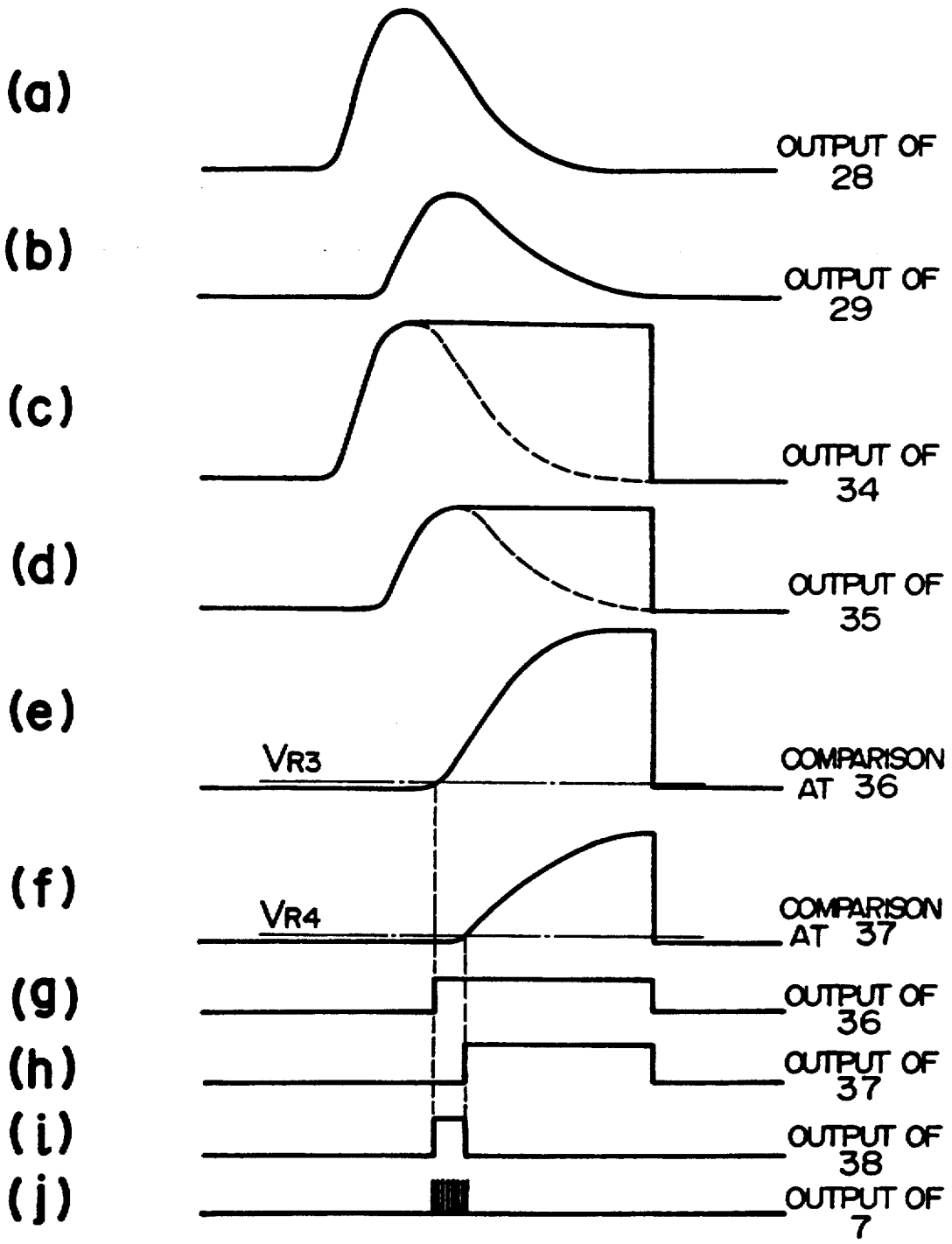

FIG. 10 is a view for illustrating the signal processing procedure performed in the system shown in FIG. 7C.

The signals (a) and (b) having wavelengths $\lambda_1$ and $\lambda_2$ produced by the photoelectric conversion circuits 28 and 29 are converted to signals (c) and (d), respectively, through the peak-hold circuits 32 and 33 and the reset circuits 34 and 35. The signals (a) and (c) are applied to the peak time detecting circuit 36 which the signals (b) and (d) are applied to the peak time point detection circuit 37. The circuits 36 and 37 perform arithmetic operations "(c)-(a)" and "(d)-(b)", respectively, the resulting signals being then inverted to be subsequently produced as the signals (e) and (f), respectively. Through comparison of the signals (e) and (f) with respective preset signals $V_{R3}$ and $V_{R4}$, pulse signals (g) and (h) are produced which assume high level when the signals (e) and (f) are greater than the preset signal $V_{R3}$ and $V_{R4}$, respectively. The signals (g) and (h) are applied to the phase difference pulse signal circuit 38, whereby a pulse signal (i) which is high only during a period intervening between the rise-up edges of the signals (g) and (h) is supplied to the controller 7. The latter counts the crank angle pulses during the period in which the signal (i) is high, as is illustrated at (j), whereby the phase difference angle between the peaks of the wavelength signals $\lambda_1$ and $\lambda_2$ can be determined.

Figure 11:
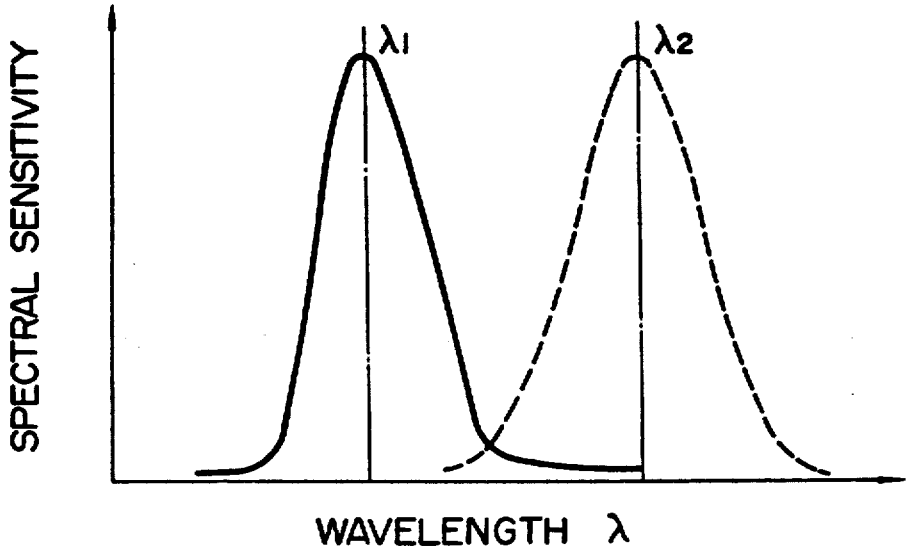
FIGS. 11 and 12 are views for illustrating spectral sensitivities of photoelectric conversion elements.

FIG. 11 illustrates graphically typical spectral sensitivity characteristics of the photoelectric conversion elements 26 and 27 employed in the signal processing systems shown in FIGS. 7A, 7B and 7C, respectively. The photoelectric conversion element 26 as employed should exhibit the peak sensitivity at the wavelength $\lambda_1$, as indicated by a solid line curve in FIG. 11, while the photoelectric conversion element 27 should exhibit the peak sensitivity at the wavelength $\lambda_2$ as indicated by a broken line curve in FIG. 11. In this conjunction, it is noted that many of the currently available photoelectric conversion elements having sharp spectral sensitivity characteristic in specific wavelength bands are very expensive. To deal with this problem and reduce the manufacturing cost, the present invention teaches combination of an inexpensive photodiode or phototransistor and an interference filter as mentioned below.

Figure 12:
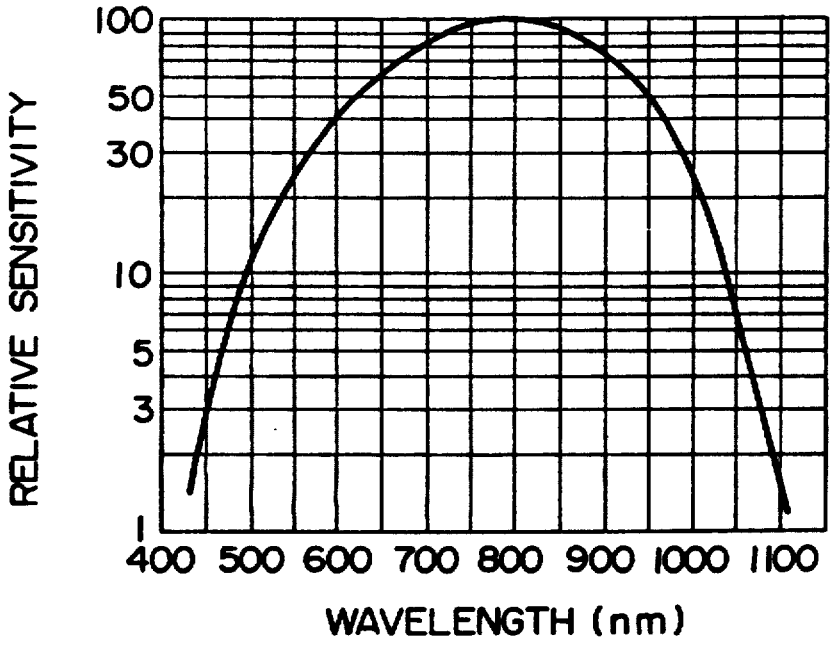
Figure 13:
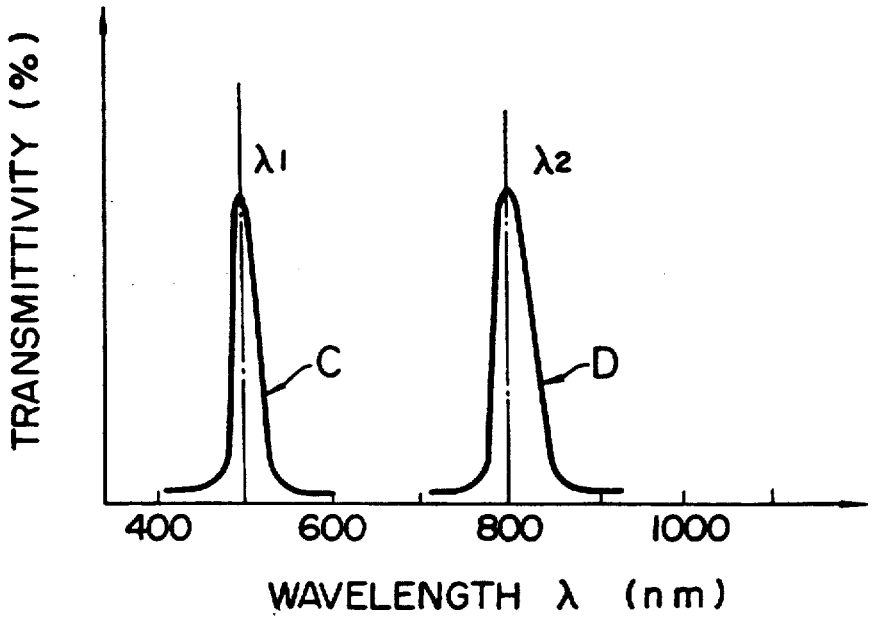
FIG. 13 is a view for graphically illustrating filter characteristics of an optical interference filter.

FIG. 12 shows a sensitivity characteristic curve of a phototransistor commercially available at low prices and capable of detecting light of relatively broad bandwidth of 400 nm to 1100 nm. Lots of this type phototransistors are on the market at present, and some of the phototransistors have the spectral sensitivity over wider range when compared with those illustrated in FIG. 11. Accordingly, two of these inexpensive photodiodes may be employed in combination with interference filters disposed in front of the photoelectric conversion elements, which filters exhibit such characteristics as illustrated in FIG. 13. In this way, the light wavelength signals $\lambda_1$ and $\lambda_2$ can be easily derived in a facilitated manner without involving high expensiveness.

The interference filter of such transmittivity characteristic in which high transmittivity is limited to a relatively narrow specific wavelength band as illustrate in FIG. 13 is available relatively readily. Accordingly, by disposing the interference filter having the characteristic C shown in FIG. 13 may be disposed in precedence to one photoelectric conversion element for detecting the light in the wavelength band $\lambda_1$, while the other interference filter having the characteristic D shown in FIG. 13 may be disposed in front of the other photoelectric conversion element for detecting the light of wavelength band $\lambda_2$.

Figure 14:
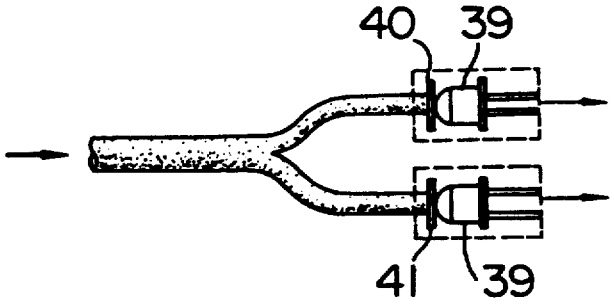
FIG. 14 is a view showing a partial modification which can be adopted in the systems shown in FIGS. 7A, 7B and 7C.

FIG. 14 shows a typical concrete arrangement of the combined filters and the photoelectric conversion elements. As will be seen in the figure, two photoelectric conversion elements 39 each exhibiting the spectral sensitivity over a wide range of wavelength such as shown in FIG. 12 are provided with interference filters 40 and 41 which have the transmittivity characteristics C and D shown in FIG. 13, respectively. With this arrangement, it is possible to receive only the combustion light of two specific wavelength bands for effecting the photoelectric conversion for subsequent processing in a substantially similar manner as mentioned in conjunction with the systems shown in FIGS. 7A, 7B and 7C.

Figure 15:
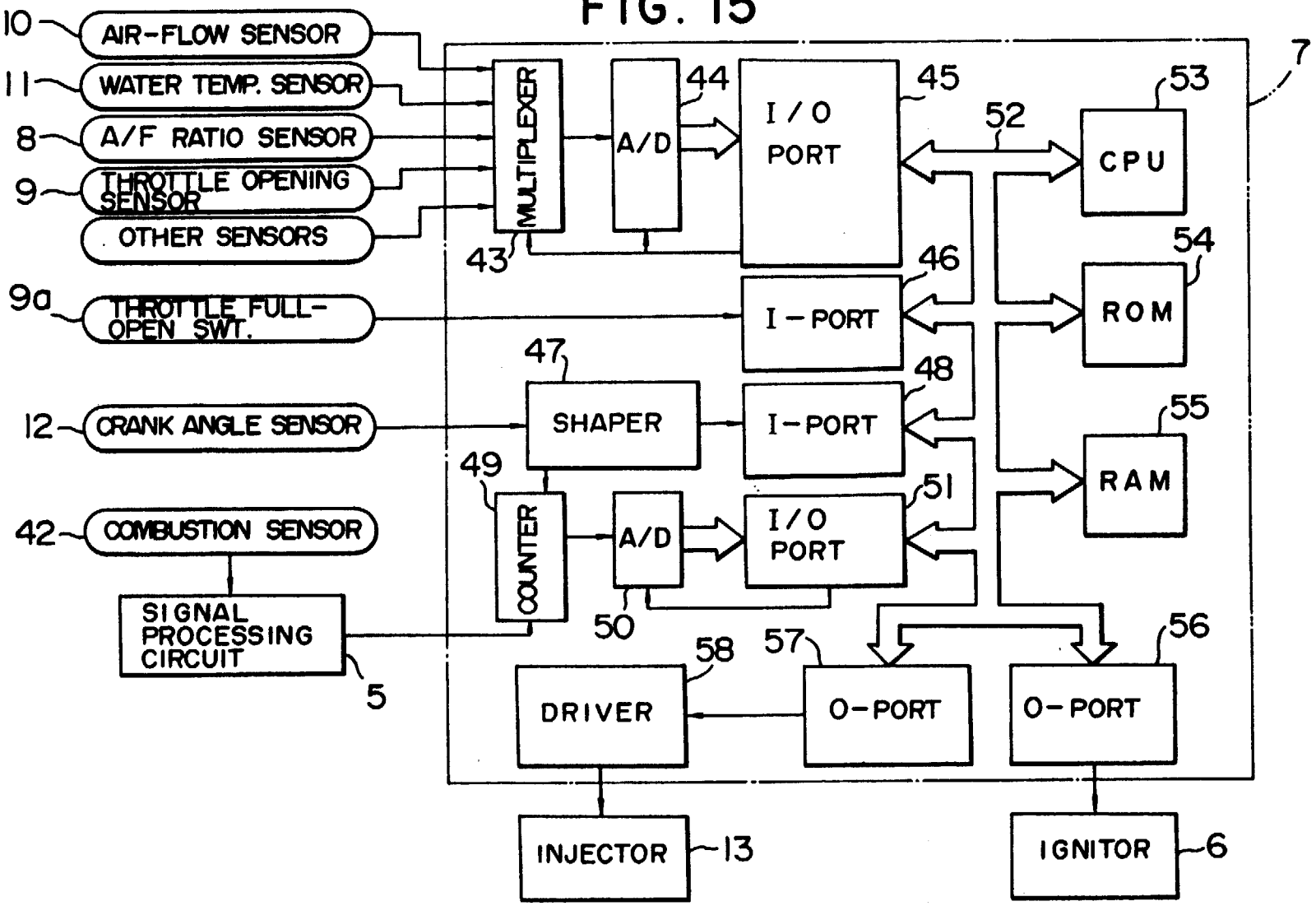
FIG. 15 is a view showing a functional structure of controller which can be employed in the system according to the invention.

FIG. 15 shows schematically an arrangement of a major portion of the controller 7. Referring to the figure, the sensor signals such as those produced by the air-flow sensor 10, the water temperature sensor 11, the air-fuel ratio sensor 8, the throttle valve position sensor 9 and others are inputted to an analogue-to-digital (A/D) converter 44 through a multiplexer 43, the output signals of the A/D converter 44 being coupled to an input/output (I/0) port 45. It is to be noted that the signal produced by a switch for detecting the fully opened state of the throttle valve (also referred to as the idle aperture detecting switch) is directly coupled to an input port 46. On the other hand, the engine rotation signal produced by the crank angle sensor 12 is coupled to an input port 48 through a waveform shaper circuit 47. The signal derived from the combustion sensor system 42 through a signal processing circuit 5, which counter 49 serves to making appearance during a period intervening between the phase difference pulses of the two wavelengths as illustrated in FIGS. 8, 9 and 10, respectively. The output signal of the counter circuit 49 is supplied to an A/D converter 50, the resulting digital output of which is then fed to an I/0 port 51. The input-/output ports as well as the input ports mentioned above are connected to a CPU (central processing unit) 53, a ROM 54 and a RAM 55 through a bus 52 for signal transfer and executing of arithmetic operations. The results of the arithmetic operations are outputted to the output ports 56 and 57, whereby the ignition apparatus 6 is activated in response to the signal from the output port 56 while the driver circuit 56 for actuating the fuel injector 13 is activated by the signal produced through the output port 57.

The ROM 54 stores therein relations between the phase difference angle signals $\Delta\zeta$ and the air-fuel ratios (A/F) or a one-dimensional map of $\Delta\theta$ and A/F, so that the air-fuel ratio corresponding to the phase difference angle signal $\Delta\theta$ obtained through the input/output port 51 can be arithmetically determined. In the case of a multi-cylinder engine system in which each cylinder is provided with the combustion sensor system, the phase difference pulse signals produced by the individual combustion sensor systems may be coupled to the counter 49 through a multiplexer (not shown in FIG. 15) for detecting the A/F ratio for each of the cylinders. When each of the cylinders is considered solely, the air-fuel ratio of the gas mixture supplied to the cylinder may naturally vary from cycle to cycle, which results in that the phase difference angle signal $\Delta\theta$ counted by the counter 49 may assume values varying from cycle to cycle. Accordingly, if the air-fuel ratio is determined on the basis of the varying phase difference angle signal $\Delta\theta$ for performing the closed loop control for each varying values of $\Delta\theta$, the control stability will be significantly deteriorated. Accordingly, to evade this difficulty, the phase difference angle $\Delta\theta$ may be sampled over several cycles and averaged to be subsequently utilized in the arithmetic determination of the air-fuel ratio (A/F). The number of sampling for deriving the averaged phase difference angle signal $\Delta\theta$ may be selected to be optimum in consideration of the individual engine performance to which the invention is to be applied.

As described hereinbefore, it has been impossible with the hitherto known combustion sensors to detect the air-fuel ratio with high accuracy due to various error inducing causes such as change in the transmittivity of the wavelengths in concern owing to deposition on the combustion light detecting face, changes brought about by heat radiation from the periphery of the combustion light detecting element. In contrast, according to the teaching of the invention that the air-fuel ratio is determined on the basis of phase difference between the time points at which specific light wavelengths ($\lambda_1$ and $\lambda_2$) are produced, it is now possible to determine the air-fuel ratio with significantly improved accuracy without undergoing the various adverse influences mentioned above. Thus, the present invention has proposed a combustion sensor system which can be employed in practical application with great advantages.

I claim:

1. A sensor system for detecting air-fuel ratio in an internal combustion engine, comprising:

(a) transparent combustion light extracting means for extracting combustion light produced in a combustion chamber of said engine;

(b) photoelectric conversion means for photoelectrically converting two given waveforms of the combustion light extracted through said combustion light extracting means into electrical wavelength signals; and (c) air-fuel ratio determining means for determining the air-fuel ratio on the basis of said two wavelength signals supplied from said photoelectric conversion means, wherein said air-fuel ratio determining means includes peak detection means for detecting peaks of the two wave-length signals produced by said photoelectric conversion means, respectively, angular difference detecting means for detecting angular difference between the peaks detected by said peak detecting means, and air-fuel ratio determining means for determining the corresponding air-fuel ratio on the basis of said angular difference.

2. A sensor system according to claim 1, wherein said photoelectric conversion means include photoelectric conversion elements disposed, respectively, at bifurcated ends of an optical fiber cable leading to the interior of said combustion chamber and which elements are sensitive to light wavelength differing from each other.

3. A sensor system according to claim 1, wherein said photoelectric conversion means include combinations of interference filters for transmitting therethrough, respectively, the wavelengths differing from each other and photoelectric conversion elements, said combinations being disposed at bifurcated ends of an optical fiber cable leading to the interior of said combustion chamber.

4. A sensor system according to claim 1, wherein said air-fuel ratio determining means includes rise-up time point detecting means for detecting time points at which the two wavelength signals from said photoelectric conversion means rise up, respectively;

said angular difference detecting means derives an angular difference in the rise-up time point between said two wavelength signals detected by said rise-up time point detecting means; and said air-fuel ratio determining means determines a corresponding air-fuel ratio on the basis of said angular difference in the rise-up time point.

5. A sensor system according to claim 4, wherein two light wavelengths to undergo the photoelectric conversion are visible light rays having wavelengths located in the vicinity of infrared and ultraviolet regions, respectively.

6. A sensor system according to claim 1, wherein said corresponding air-fuel determining means includes a function memory storing data defining the air-fuel ratio and angular differences.

7. A sensor system according to claim 1, wherein said corresponding air-fuel determining means includes a function memory storing data defining the air-fuel ratio and angular differences.

8. A sensor system according to claim 1, wherein two light wavelengths to undergo the photoelectric conversion are visible light rays having wavelengths located in the vicinity of infrared and ultraviolet regions, respectively.

9. A sensor system for detecting air-fuel ratio in an internal combustion engine, comprising:

(a) transparent combustion light extracting means for extracting combustion light produced in a combustion chamber of said engine;

(b) photoelectric conversion means for photoelectrically converting two given waveforms of the combustion light extracted through said combustion light extracting means into electrical wavelength signals; and (c) air-fuel ratio determining means for determining the air-fuel ratio on the basis of said two wavelength signals supplied from said photoelectric conversion means, wherein said air-fuel ratio determining means includes peak detecting means for detecting peaks of the two wave-length signals produced by said photoelectric conversion means, respectively, angular difference detecting means for detecting an angular difference in the rise-up time point between said two wavelength signals detected by said rise-up time point detecting means; and air-fuel ratio determining means for determining the corresponding air-fuel ratio on the basis of said angular difference.

10. A sensor system according to claim 9, wherein said corresponding air-fuel determining means includes a function memory storing data defining the air-fuel ratio and angular differences.

11. A sensor system according to claim 9, wherein said air-fuel ratio determining means includes peak detecting means for detecting peaks of the two wavelength signals produced by said photoelectric conversion means, respectively; said angular difference detecting means detects angular difference between the peaks detected by said peak detecting means, and said air-fuel ratio determining means determines the corresponding air-fuel ratio on the basis of said angular difference.

12. A sensor system according to claim 11, wherein said corresponding air-fuel determining means includes a function memory storing data defining the air-fuel ratio and angular differences.

13. A sensor system according to claim 11, wherein two light wavelengths to undergo the photoelectric conversion are visible light rays having wavelengths located in the vicinity of infrared and ultraviolet regions, respectively.

14. A sensor system according to claim 9, wherein two light wavelengths to undergo the photoelectric conversion are visible light rays having wavelengths located in the vicinity of infrared and ultraviolet regions, respectively.

*15. In an internal combustion engine having a control system including a controller receiving inputs of sensed engine operating conditions and outputting control signals for controlling engine operating parameters to optimize the engine operating conditions, the improvement comprising:*

*transparent combustion light extracting means for extracting combustion light produced in a combustion chamber of the engine;*

*photoelectric conversion means for photoelectrically converting two wavelengths of the combustion light extracted through said combustion light extracting means into electrical wavelength signals;*

*an air-fuel ratio determining means for determining the air-fuel ratio on the basis of said two wavelength signals supplied from said photoelectric conversion means, wherein said air-fuel ratio determining means includes means for detecting time points of the two wave-length signals, respectively, difference detecting means for detecting a time difference between the time points, and means for determining a corresponding air-fuel ratio on the basis of said time difference; and*

*said controller receiving said air-fuel ratio determined by said air-fuel ratio determining means as one of said inputs of sensed engine operating conditions.*

*16. In an internal combustion engine having a control system including a controller receiving inputs of sensed engine operating conditions and outputting control signals for controlling engine operating parameters to optimize the engine operating conditions, the improvement comprising:*

*first means for detecting light of the combustion within a cylinder of the engine and providing a first output signal that varies in accordance with intensity of the combustion light;*

*first means for comparing the first output signal with a first predetermined reference level;*

*means for producing a beginning point of combustion when the first output signal exceeds said first predetermined reference level;*

*second means for detecting light of the combustion within the combustion chamber of the engine and providing a second output signal wherein the wavelength of light detected by said second detecting means differs from the wavelength of light detected by said first detecting means and said second output signal varies in accordance with intensity of the combustion light detected by said second detecting means;*

*second means for comparing the second output signal with a second predetermined reference level;*

*means establishing a predetermined reference time point when said second output signal exceeds said second predetermined reference level;*

*third means for comparing a time point of said combustion beginning point with said reference time point to obtain a difference in time and providing a time difference output that changes in accordance with the operating conditions of the engine; and*

*said controller receiving said time difference output as one of said inputs of sensed operating conditions.*

*17. In an internal combustion engine having a control system including a controller receiving inputs of sensed engine operating conditions and outputting control signals for controlling engine operating parameters to optimize the engine operating conditions, the improvement comprising:* means for detecting light of combustion within a combustion chamber of the engine and providing an output signal that varies in accordance with intensity of the combustion light;

*first means for comparing the output signal with a predetermined reference level;*

*means for producing a beginning point of combustion signal when the output signal exceeds said predetermined reference level;*

*second means for comparing a time of said combustion beginning point signal with a reference time point to obtain a difference in time and providing a time difference output that changes in accordance with the operating conditions of the engine; and*

*said controller receiving said time difference output as one of said inputs of sensed operating conditions.*

*18. In a control system for an internal combustion engine, the improvement comprising:*

*means for detecting light of combustion in a combustion chamber of the engine and providing an output signal that varies in accordance with an intensity of the combustion light;*

*first means for comparing the output signal with a predetermined reference level;*

*means for determining and producing a beginning point of combustion signal when the output signal exceeds said predetermined reference level; and* second means for comparing a time of said combustion beginning point signal with a reference time point to obtain a difference in time and providing a time difference output that changes in accordance with operating conditions of the engine.

*19. An engine control system according to claim 18, further comprising:* said means for detecting combustion light having means for detecting a first wavelength of the combustion light;

said means for generating said reference time point having means for detecting a second wavelength of the combustion light and providing a second output signal that varies in accordance with an intensity of the second wavelength of the combustion light; means for comparing the second output signal with a second predetermined reference level whereby said reference time point is generated when the second output signal exceeds said second predetermined reference level.

*20. A method, comprising the steps of: detecting light of combustion in a combustion chamber of an internal combustion engine and providing an output signal that varies in accordance with an intensity of the detected combustion light;* comparing the output signal with a predetermined reference level;

*determining a beginning point of the combustion when the output signal exceeds said predetermined reference level; and*

*comparing a time of said combustion beginning point with a reference time point to obtain a difference in time and providing a time difference output that changes in accordance with operating conditions of the engine.*

*21. A method according to claim 20, further comprising:*

*said detecting of combustion light step including detecting a first wavelength of the combustion light;*

*generating said reference time point by detecting a second wavelength of the combustion light and providing a second output signal that varies in accordance with an intensity of the second wavelength of the combustion light; comparing the second output signal with a second predetermined reference level whereby said reference time point is generated when the second output signal exceeds said second predetermined reference level.*

*22. A method according to claim 20, further comprising: controlling an operating parameter of the engine in accordance with the time difference output.*

*23. A method of detecting combustion in a combustion chamber of an internal combustion engine, comprising:*

*detecting light of the combustion within the combustion chamber and providing an output signal that varies according to an intensity of the combustion light as it increases from a beginning of combustion to a peak of the combustion light intensity;*

*determining and producing a beginning point of combustion signal from said output signal including comparing the output signal with a predetermined reference level and producing said beginning point of combustion signal when the output signal exceeds said predetermined reference level; and* comparing a time of said combustion beginning point signal with a reference time point to obtain a difference in time and providing a time difference output that changes in accordance with the operating conditions of the engine.

* * * * *